US00RE34266E

United States Patent [19]

Schairbaum

[11] E Patent Number: Re. 34,266

[45] Reissued Date of Patent: Jun. 1, 1993

[54] WORK STATION WITH UNDERDESK DISPLAY

[76] Inventor: Edward C. Schairbaum, 3688 Encanto, Fort Worth, Tex. 76109

[21] Appl. No.: 647,701

[22] Filed: Dec. 21, 1990

Related U.S. Patent Documents

Reissue of:

[64] Patent No.: 4,590,866
Issued: May 27, 1986
Appl. No.: 580,804
Filed: Feb. 16, 1984

[51] Int. Cl.[5] ..... A47B 85/00

[52] U.S. Cl. ..... 108/23; 108/28; 312/208.1; 312/7.2; 248/444.1

[58] Field of Search ..... 312/7.2, 208, 194; 108/23, 28, 26, 5, 6, 4, 50, 161; 248/444.1, 917, 918, 920, 442.2, 639; 358/254; 362/33

[56] References Cited

U.S. PATENT DOCUMENTS

| | | | |
|---|---|---|---|
| D. 233,759 | 11/1974 | Pycha et al. . | |
| D. 236,351 | 8/1975 | Clayton et al. . | |
| D. 278,956 | 5/1985 | Gordon | D14/100 |
| 472,099 | 4/1892 | Wyns . | |
| 536,709 | 4/1895 | Talman . | |
| 549,347 | 11/1895 | Clark . | |
| 861,810 | 7/1907 | Coblentz | 248/133 |
| 972,923 | 10/1910 | Ritter . | |
| 1,490,917 | 4/1924 | Finkelstein . | |
| 1,652,774 | 12/1927 | Fraser et al. . | |
| 1,778,163 | 10/1930 | Moore . | |
| 1,996,767 | 4/1935 | Hunter . | |
| 2,341,125 | 2/1944 | Spear . | |
| 2,646,325 | 7/1953 | Abrahamson . | |
| 2,853,351 | 9/1958 | Bassett . | |
| 3,021,185 | 2/1962 | Kowalczyk . | |
| 3,365,259 | 1/1968 | Heisman et al. | 312/194 |
| 3,367,290 | 2/1968 | Barecki | 108/50 |
| 3,658,397 | 4/1972 | Hofmann-Igl | 312/194 |
| 3,702,209 | 11/1972 | Moore | 312/196 |
| 3,770,334 | 11/1973 | Weber | 312/223 |
| 3,801,175 | 4/1974 | Giulie | 312/184 |
| 3,865,445 | 2/1975 | Dean et al. | 312/184 |
| 3,936,201 | 2/1976 | Kenney et al. | 402/4 |
| 3,940,136 | 2/1976 | Runte | 273/85 R |
| 3,980,360 | 9/1976 | Wright et al. | 312/184 |
| 4,056,296 | 11/1977 | Hedstrom et al. | 312/184 |
| 4,073,556 | 2/1978 | Wilson, Jr. | 248/1 A |
| 4,111,506 | 9/1978 | Gorkiewicz | 312/211 |
| 4,171,854 | 10/1979 | Hedstrom et al. | 312/184 |

(List continued on next page.)

FOREIGN PATENT DOCUMENTS

| | | |
|---|---|---|
| 267100 | 5/1963 | Australia . |
| 1106895 | 8/1981 | Canada . |
| 1236872 | 5/1988 | Canada . |
| 145410 | 6/1985 | European Pat. Off. . |
| 2839770 | 3/1980 | Fed. Rep. of Germany . |
| 3003017 | 7/1981 | Fed. Rep. of Germany . |
| 3308872 | 9/1984 | Fed. Rep. of Germany . |
| 577677 | 9/1924 | France . |
| 2314690 | 1/1977 | France . |
| 60-84621 | 5/1985 | Japan . |
| 659370 | 3/1987 | Switzerland . |
| 619022 | 3/1949 | United Kingdom . |
| 1222730 | 10/1967 | United Kingdom . |

(List continued on next page.)

*Primary Examiner*—Gerald A. Anderson
*Attorney, Agent, or Firm*—Olson & Hierl, Ltd.

[57] ABSTRACT

A computer work station is described in which a work table has a transparent generally horizontal work surface, a keyboard rested upon this table, and a CRT. To make the work station more usable, the CRT is movably suspended beneath the transparent work surface so that the screen of the CRT is visible therethrough. The CRT is preferably mounted for side to side, forward and back, swingable and rotational motion so as to be movable to a variety of positions and angles beneath the transparent work surface whereby its display will be conveniently visible on many portions of the table desired by the worker.

24 Claims, 1 Drawing Sheet

U.S. PATENT DOCUMENTS

Figure 1:
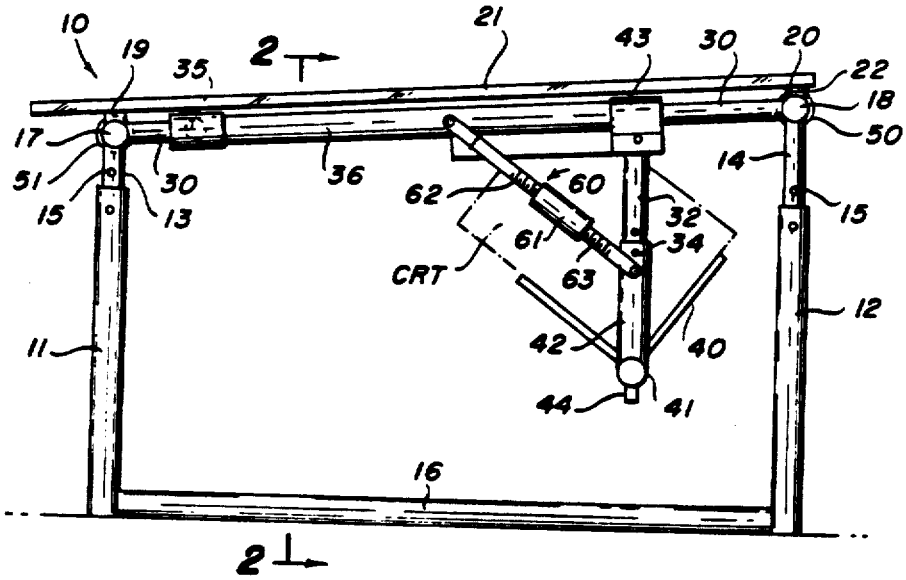

| | | | |
|---|---|---|---|
| 4,313,112 | 1/1982 | Foster | 340/700 |
| 4,314,734 | 2/1982 | Grunert | 312/322 |
| 4,316,082 | 2/1982 | Fritz | 248/1 B |
| 4,345,803 | 8/1982 | Heck | 312/194 |
| 4,372,515 | 2/1983 | Noonan | 248/178 |
| 4,410,159 | 10/1983 | McVicker et al. | 248/349 |
| 4,428,631 | 1/1984 | Cope et al. | 312/194 |
| 4,449,762 | 5/1984 | Turner | 312/196 |
| 4,453,689 | 6/1984 | Ellis et al. | 248/288 |
| 4,458,961 | 7/1984 | Browning | 312/196 |
| 4,483,572 | 11/1984 | Story | 312/196 |
| 4,561,619 | 12/1985 | Robillard et al. | 248/285 |
| 4,562,482 | 12/1985 | Brown | 358/254 |
| 4,590,866 | 5/1986 | Schairbaum | 108/23 |
| 4,637,666 | 1/1987 | Worrell et al. | 312/196 |
| 4,668,026 | 5/1987 | Lapeyre et al. | 312/7.2 |
| 4,669,789 | 6/1987 | Pemberton | 312/7.2 |
| 4,712,842 | 12/1987 | Price et al. | 312/196 |
| 4,725,106 | 2/1988 | Shields et al. | 312/208 |
| 4,755,009 | 7/1988 | Price et al. | 312/194 |
| 4,766,422 | 8/1988 | Wolters et al. | 340/700 |
| 4,779,139 | 10/1988 | Lapeyre et al. | 358/252 |
| 4,836,478 | 6/1989 | Sweere | 248/1 E |
| 4,836,625 | 6/1989 | Catta | 312/257 SK |
| 4,861,121 | 8/1989 | Gotz | 312/208 |
| 4,884,773 | 12/1989 | Becker | 248/639 |
| 4,920,458 | 4/1990 | Jones | 362/33 |
| 4,932,332 | 6/1990 | Noda | 108/50 |

FOREIGN PATENT DOCUMENTS

| | | |
|---|---|---|
| 1408701 | 10/1975 | United Kingdom . |
| 1462266 | 1/1977 | United Kingdom . |

WORK STATION WITH UNDERDESK DISPLAY

Matter enclosed in heavy brackets [ ] appears in the original patent but forms no part of this reissue specification; matter printed in italics indicates the additions made by reissue.

DESCRIPTION

1. Technical Field

This invention relates to a computer work station in which a cathode ray tube (CRT) ispositioned in a manner which enhances the user's capacity to work at the station.

2. Background Art

Computer work stations comprising a CRT and a keyboard for operating it are well known. These frequently include disc drives and printers which may be at the same or another location, but the work station always includes a CRT and a keyboard for operating the same. These are now both rested on a table, usually with the CRT immediately above and behind the keyboard.

This is a poor location for the CRT in many circumstances. It is difficult to see when the user wears glasses with bifocal lenses. It is a poor location for one who wishes to work with the data on the CRT, rather than to merely supply or change that data using the keyboard. For some tasks it is desirable to have the CRT closely associated with the keyboard, but for other tasks this is not the case.

Despite these evident limitations, there has been no satisfactory CRT location at the known work stations, and those who now use these devices must accept the limitations which presently apply.

Part of the problem may be due to the fact that it has been customary for those who work with data to be different from those who type it. The final work product is provided by several persons, the individual using the computer work station supplying primarily only the typing function. However, professional individuals are today finding themselves more frequently doing all sorts of tasks, including assembling the data they use, manipulating that data, and also presenting their material in a form suitable for direct print-out. Under these circumstances, the work station user must be able to perform more varied activities, and this is not easy to do with the presently constituted work stations.

DISCLOSURE OF INVENTION

In accordance with this invention, a computer work station comprises a work table having a transparent generally horizontal work surface, a keyboard rested upon the table, and a CRT, this CRT being movably suspended beneath the transparent work surface so that the screen of the CRT is visible therethrough. Since the CRT is to be movable and since, as later pointed out, the keyboard may be supported on various portions of the work table, the two are obviously movably associated with one another.

More particularly, the CRT is mounted from side-to-side, forward and back, swingable and rotational motions so as to be movable to a variety of positions and angles beneath the transparent work surface so that its display will be conveniently visible on many portions of the table desired by the worker. To accomplish this, the work table is formed with a plurality of legs which support parallel front and back horizontally extending telescoping tubes upon which the transparent work surface is supported, and the CRT mounting means including a pair of tubular supports interconnecting these horizontal tubes and slidable thereupon to permit the CRT to be moved from side to side beneath the table. A pair of tubular braces are fitted over these tubular supports and are slidable thereupon to permit the CRT to be moved forward and back beneath the table. The CRT mounting means is swingably carried by downwardly extending swing arms pivoted to these last-named tubular braces and is mounted for pivotal movement about the vertical axis. The invention includes the table which will carry the keyboard and CRT.

Also, the transparent work surface is preferably supported by raised elements carried by the front and back horizontal tubes so that the CRT mounting means can slide on the horizontal tubes without encountering the work surface.

It will also be understood that the display will be visible at a downward angle to a worker seated in front of the table. In this way, he can use bifocal lenses more conveniently. He can also write on a generally horizontal surface almost directly alongside the information which he sees on the CRT.

The table in this invention is normally formed with four legs (preferably vertically adjustable) which support the front and back horizontal tubes. These legs are adjustable to suit the user. The front legs can be placed in a lower position than the back legs to give the work surface a slight incline which some users may like for some purposes. Raised elements extend above the tubes near the four legs so that the transparent work surface, which preferably consititutes the entire top of the table, can rest above the tubes. This is one way to free the CRT mounting means for motion beneath the table. The swing-arm and the pivotal mounting permit the CRT to rotate and swing to the desired viewing position after side-to-side and forward and back motion has placed the CRT in a desired location.

Means are also used to space the front and back tubes, and the transparent work surface is preferably hinged to the back tubes so that it can be pivoted to elevate it at the front, which eases the burden of reaching the CRT to adjust some aspect of its operation. Such adjustment is sometimes required, but it is not frequently needed.

The length of the swing arms which carry the CRT is also variable because different CRTs are of different dimensions. These supports are adjusted so that the top of the CRT is just slightly beneath the undersurface of the transparent work surface. This adapts the length of the swing support to the size of the CRT by bringing the data to be read as close as possible to the user.

In preferred construction, the CRT is positioned in a right angle bracket which is at an angle to the horizontal when the swing arms extend downwardly and this bracket is rotatably mounted upon a support which interconnects the lower ends of the swing arms.

Figure 2:
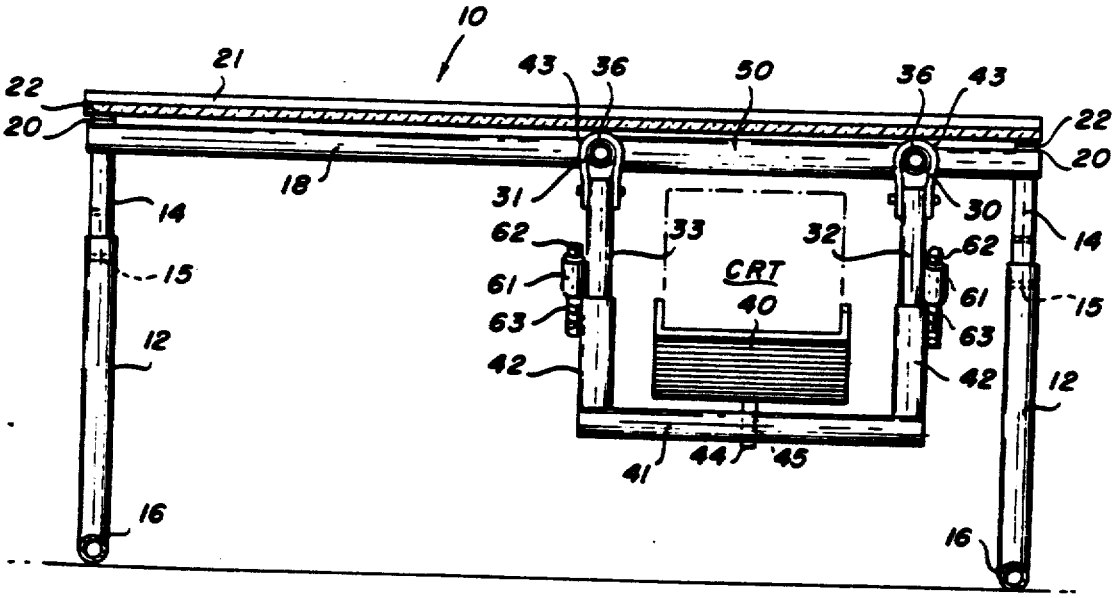

The invention will be more fully understood from the accompanying drawing in which:

FIG. 1 is an end view of a work station constructed in accordance with this invention; and FIG. 2 is a cross-section taken on the line of 2—2 of FIG. 1.

Referring to FIG. 1, the numeral 10 generally identifies a table containing front legs 11 and back legs 12. As can be seen, these legs 11 and 12 are telescoped so that their upper ends 13 and 14 can be elevated to any desired position using pins 15 which are commonly used for this purpose. Clamps can be substituted. The front and back legs are spaced apart by base spacer 16. The upper ends of the front legs are interconnected by front and back tubes 17 and 18 in FIG. 1, the legs 11 and 12 are at slightly different heights to provide a slope to the work surface, but that surface can be horizontal, and the horizontal position would be preferred in many circumstances.

The front and back tubes 17 and 18 carry lifts 19 and 20 upon which are rested a transparent work surface 21, which normally would be made of glass about ⅛th inch to ¼inch in thickness. It is preferred to hinge the glass work surface 21 to the rear tube 18, one of the hinges being shown at 22.

The front and back tubes are interconnected by parallel tubes 30 and 31, only one of which can be seen in FIG. 1. These tubes 30 and 31 are each made in three telescoped sections. Thus, tube 30 more particularly includes tube ends 30 and 30A and central portion 36, while tube 31 more particularly includes tube end 31, central portion 36', and a remote tube end, like tube end 30A, not shown, including a central larger diameter portion 36 which carries the CRT via swing arms 32 and 33 which telescope with respect to lower portions 42 and are adjustable in length via pins 34. Tubes 30 and 31 are spaced apart by a spacing bar 35 which is secured to a central portion of these tubes, as will be discussed, and preferably positioned, as shown, near the front of the table.

The CRT is supported on a right angle bracket 40 which is rotatably mounted on a horizontal support 41. In this illustration of the invention, the rotatable mounting is by a downward spindle 44 fixed to the bottom of bracket 40 and which is extended through a hole in the support 41. The CRT is shown in phantom, and is simply placed on the bracket 40 which may have openings therein to allow cables to interconnect the CRT with the remaining portions of the computer. As shown in FIG. 1, the CRT is positioned so that its screen or display is at an angle to the work surface 21 to be visible from the front of the table.

Support 41 is carried at the lower ends 42 and 42' of telescoping swing arms 32 and 33, and these are pivotally mounted at their upper ends by means of collars 43 and 43' which are secured to the portions 36 asnd 36' of tubes 30 and 31. Since the portions 36 are slidably disposed on the tubes 30 and 31, this means that the CRT can be shifted front to back by manual operation.

The side to side shifting of the CRT is more fully shown in FIG. 2 where it will be seen that the back tube 18 has mounted thereon a larger diameter tube 50 and the tubes 30 and 31 are connected thereto. In this way as the tube 50 slides laterally along the back tube 18 (a corresponding element 51 will slide laterally along the front tube 17) the tubes 30 and 31 are shifted laterally, and the CRT is shifted laterally along with them.

It is desired to be able to swing the swing arms 32 and 33 in order to position the angle of the CRT, and this is done by means of the element 60 which is of variable length as a result of the combination of a central collar 61 with threaded bars 62 and 63. Bar 62 is pivotally connected to the tube 36 and bar 63 is pivotally connected to a lower portion 42 of the swing arm 32. One or two of these may be used as desired, and it is well known that rotation of the collar will vary the length of the combined bars so as to position the swing arm and thereby vary the angle of the CRT.

To summarize the operation, the table is adjusted to the user by choosing the lengths of the legs 11 and 12 via the placing of pins 15. The CRT is placed on bracket 40 and its elevation selected by appropriately placing pins 34. The lateral position of the CRT is adjusted by pushing the assembly which carries the CRT to the side which causes tubes 50 and 51 to slide over tubes 17 and 18. The forward to back position is obtained by pushing the assembly which carries the CRT forward or back to cause large diameter tubes 36 to slide over tubes 30 and 31. It will be seen that these tubes 30 and 31 are formed in several sections so that the height of legs 11 and 12 may differ from one another. When the CRT is positioned, as above indicated, it can now be rotated by turning spindle 44 in the vertical hole 45 in the support 41 to allow easy viewing. The collar 61 is now used to vary the length of the element 60 which moves the swing arms 32 and 33 to adjust the angle of the CRT.

It should be observed that a tubular construction has been illustratred, and this is the presently preferred form of the invention. These tubes are preferably round, but any slidable construction can be used. Moreoever, a sliding construction represents only one particularly practical means for moveably supporting the CRT beneath the transparent work surface, and other constructions, such as jointed support arms, will be apparent to those skilled in the art. Also, and while it is presently preferred to have the entire upper surface of the desk transparent, a portion thereof may be of conventional opaque construction so long as a sufficient transparent surface remains so that several executive functions can be carried out on different portions of the transparent surface with the CRT being moved to facilitate such functions. This is illustrated by the fact that one might wish to support a telephone and the keyboard on non-transparent portions of the table or desk.

What is claimed is:

1. A computer work station comprising a work table having a transparent generally horizontal work surface, a CRT, a keyboard movably associated with said *work station and independently movably associated with said* CRT, and *CRT mounting* means *cooperative with said work table* to [suspend] *support bottom portions of* said CRT *and to uphold said CRT* beneath said transparent work surface with the screen of said CRT at an angle to said work surface so that [the] *said* screen [of the CRT] is visible therethrough at a downward angle to a worker using [the] *said* work station, [and] said *CRT mounting* means [to suspend said CRT] including means for moving said CRT to a variety of positions and angles beneath [the] *said* transparent work surface whereby [its] *the* display *of said screen* will be conveniently visible to said worker at many positions about [the] *said* table.

2. A computer work station as recited in claim 1 in which said work table is formed with a plurality of legs which support parallel front and back horizontally extending telescoping tubes above which said transparent work surface is supported, said CRT mounting means including a pair of tubular supports interconnecting said horizontal tubes and slidable therewith as said tubes are telescoped to permit [the] *said* CRT to be moved from side to side beneath [the] *said* table.

3. A computer work station as recited in claim 2 in which a pair of tubular braces [are] *is* fitted over said last-named tubular supports and are slidable thereupon to permit [the] *said* CRT to be moved forward and back beneath [the] *said* table.

4. A computer work station as recited in claim 3 in which said CRT mounting means is carried by downwardly extending swing arms pivoted to said last-named tubular [braces] *supports.*

5. A computer work station as recited in claim 4 in which said transparent work surface is supported by raised elements carried by said front and back horizontal tubes so that [the] *said* CRT mounting means can slide on said horizontal tubes without encountering [the] *said* work surface.

6. A computer work station as recited in claim 5 in which said transparent work surface constitutes the entire top of [the] *said* table, and is hinged at the back to slope said work surface.

7. A computer work station as recited in claim 4 in which said legs are adjustable in length to adapt the height of [the] *said* table to [the user] *said worker* , and the length of said downwardly extending swing arms is adjustable to adapt the length of [the] *said* swing arms to the size of [the] *said* CRT.

8. A computer work station as recited in claim 7 in which said CRT [is positioned in] *mounting means includes* a right angle [bracket which is] *member on which said CRT is positioned, and said CRT is inclined* at an angle to the horizontal when [the] *said* swing arms extend downwardly, and said [bracket] *member* is rotatably mounted upon a support which interconnects the lower ends of said swing arms.

9. A work table adapted to provide a computer work station comprising a transparent generally horizontal work surface adapted to support a keyboard rested thereupon, said work table having means [to] *for* movably [suspend said] *supporting a* CRT beneath said transparent work surface with the screen of said CRT at an angle to said work surface so that [the] *said* screen [of the CRT] is visible therethrough at a downward angle to a worker seated in front of [the] *said* table, said [suspending] *supporting* means to move said CRT from side to side, forward and back, swingably and rotationally so as to be movable to a variety of positions and angles beneath [the] *said* transparent work surface whereby [its] *the* display *of said screen*will be conveniently visible [on] *through* many portions of [the table] *said transparent work surface as* desired by [the] *said* worker.

10. A work table as recited in claim 9 in which said table is formed with a plurality of legs which support parallel front and back horizontally extending telescoping tubes upon which said transparent work surface is supported.

11. A work table as recited in claim 10 in which tubular supports extend between said horizontal tubes [a] with *a* pair of tubular braces being fitted over said last-named tubular supports and slidable thereupon to permit [the] *said* CRT to be moved forward and back beneath [the] *said* table.

12. A work table as recited in claim 11 in which said CRT [suspending] *supporting* means is carried by downwardly extending swing arms pivoted to said last-named tubular braces.

13. A work table as recited in claim 12 in which said transparent work surface is supported by raised elements carried by said front and back horizontal tubes so that [the] *said* CRT [suspending] *supporting* means can slide on said horizontal tubes without encountering [the] *said* work surface.

14. A work table as recited in claim 13 in which said transparent work surface is hinged at the back *thereof* to be elevatable at the front *thereof.*

15. A work table as recited in claim 14 in which said legs are adjustable in length to adapt the height of [the] *said* table to the [the user ] *said worker* and the length of said downwardly extending swing arms is adjustable to adapt the length of [the] *said* swing arms to the size of a selected *said* CRT.

16. A work table as recited in claim 15 in which *said supporting means includes* a right angle bracket *that is* adapted to support [a] *said* CRT, [is] *right angle bracket being* mounted on a [support] *holding means* which interconnects the lower ends of said swing arms, said right angle bracket being positioned at an angle to the horizontl when [the] *said* swing arms extend downwardly, and said *right angle* bracket [is] *being* rotatably mounted *by* said [support] *holding means* to permit rotation of said CRT about a vertical axis.

*17. A computer work station comprising a work table having a transparent generally horizontal work surface, a CRT, a keyboard associated with said work station and independently and movably associated with said CRT, and bracket means cooperative with said work table to support bottom portions of said CRT to uphold said CRT beneath said transparent work surface with the screen of said CRT being at an angle to said work surface so that said screen is visible therethrough at a downward angle to a worker using said work station, said bracket means including means for moving said CRT to a plurality of heights and angles beneath said transparent work surface whereby the display of said screen will be conveniently visible to said worker through said work surface.*

*18. A computer work station comprising:*

*(a) a flat surfaced member supported generally horizontally by understanding leg means, at least a portion of said member being transparent; and*

*(b) bracket means adjustably associated with said work station, said bracket means having support means for upholding bottom portions of a cathode ray tube, and having means for adjustably mounting said support means beneath said flat surfaced member for movement of said support means relative thereto including means for pivotal movement vertically with (1) said cathode ray tube being oriented for visibility at a downward angle through said transparent portion and (2) a keyboard being independently associated with said work station.*

*19. A computer work station comprising:*

*(a) a flat surfaced member supported generally horizontally by upstanding leg means, said flat surfaced member including a transparent portion;*

*(b) bracket means associated with said work station for supporting and upholding bottom portions of a cathode ray tube beneath said flat surfaced member with the screen of said cathode ray tube disposed angularly for viewability by a worker looking downwardly through said transparent portion from a location laterally adjacent said flat surfaced member;*

*(c) said bracket means including adjustment means for adjustably horizontally and vertically moving and positioning said bracket means relative to said flat surfaced member; and*

*(d) a keyboard independently movably associated with said cathode ray tube.*

*20. A desk configuration comprising:*

*(a) a member having a planar work surface and having spaced longitudinal front and rear edges;*

*(b) means supporting said planar work surface, and*

*(c) CRT support means mounted beneath said planar work surface including means for longitudinal, vertical and/or lateral movements of said CRT support means relative thereto and for adjustably supporting and upholding bottom portions of a cathode ray tube, such that said cathode ray tube is located entirely beneath said work surface and is movable on said CRT support means to a variety of positions and angles while associated with a keyboard that is separately and independently associated with said desk configuration; and*

*(d) at least a portion of said planar work surface being transparent so as to provide visual access to said cathode ray tube.*

*21. A desk configuration for supporting a CRT and a keyboard independently of one another, said desk configuration comprising a supported, generally horizontal work surface having a transparent portion; and bracket means associated with said work station for adjustably supporting and upholding bottom portions of said CRT beneath said work surface with the screen of said CRT being at an angle to said work surface so that said screen is visible through said transparent portion at a downward angle to a worker using said CRT; said bracket means including adjustment means for moving said CRT to a plurality of heights and angles beneath said transparent portion whereby the display of said screen will be conveniently visible to said worker therethrough.*

*22. A computer work station as recited in claim 1 in which said work surface includes non-transparent portions.*

*23. A work table as recited in claim 9 in which said work surface includes non-transparent portions.*

24. A computer work station as recited in claim 1 which said CRT mounting means includes a right angle member for supporting said CRT.

* * * * *

UNITED STATES PATENT AND TRADEMARK OFFICE

CERTIFICATE OF CORRECTION

PATENT NO. : Re. 34,266

DATED : June 1, 1993

INVENTOR(S) : Edward C. Schairbaum

It is certified that error appears in the above-identified patent and that said Letters Patent is hereby corrected as shown below:

Column 1, line 12, change "ispositioned" to --is positioned--.

Column 1, line 61, change "from" to --for--.

Column 2, line 12, change "the" to --a--.

Column 2, line 64, change "of 2--2" to --2--2--.

Column 3, line 6, change "18 in" to --18. In--.

Column 3, line 48, change "asnd" to --and--.

Column 5, Claim 9, line 14, change "screenwill" to --screen will--.

Column 6, Claim 18, line 3, change "understanding" to --upstanding--.

Column 7, Claim 20, line 4, change "surface," to --surface;--.

Column 8, Claim 24, line 1, change "claim 1" to --claim 1 in--.

Signed and Sealed this

Twenty-eighth Day of June, 1994

Bruce Lehman

*Attest:*

BRUCE LEHMAN

*Attesting Officer*

*Commissioner of Patents and Trademarks*